US006643330B1

(12) United States Patent
Nakagawa et al.

(10) Patent No.: US 6,643,330 B1
(45) Date of Patent: *Nov. 4, 2003

(54) DATA PROCESSING METHOD AND APPARATUS FOR A DATA STREAM INCLUDING OBJECT STREAMS

(75) Inventors: Toshiyuki Nakagawa, Kawasaki (JP); Hiroshi Inoue, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,209

(22) Filed: Dec. 1, 1999

(30) Foreign Application Priority Data

Dec. 3, 1998 (JP) .......................... 10-344744

(51) Int. Cl.[7] ............................... H04B 1/66
(52) U.S. Cl. ............................... 375/240.28
(58) Field of Search .................. 348/423.1, 425.4, 348/500, 521; 375/240.01, 240.11, 240.19, 240.08, 240.27; 382/238, 232, 248

(56) References Cited

U.S. PATENT DOCUMENTS

| | | | | |
|---|---|---|---|---|
| 5,537,409 A | * | 7/1996 | Moriyama et al. | 370/471 |
| 5,680,639 A | * | 10/1997 | Milne et al. | 707/500.1 |
| 5,748,187 A | | 5/1998 | Kim et al. | 345/302 |
| 5,946,487 A | * | 8/1999 | Dangelo | 717/148 |
| 5,978,510 A | * | 11/1999 | Chung et al. | 382/238 |
| 6,041,365 A | * | 3/2000 | Kleinerman | 709/328 |
| 6,075,576 A | * | 6/2000 | Tan et al. | 348/425.4 |
| 6,141,385 A | * | 10/2000 | Yamaji | 375/240.27 |
| 6,351,439 B1 | * | 2/2002 | Miwa et al. | 369/47.18 |
| 6,424,478 B2 | * | 7/2002 | Hamai et al. | 360/48 |
| 2001/0012441 A1 | * | 8/2001 | Lee | 386/98 |

FOREIGN PATENT DOCUMENTS

| | | | |
|---|---|---|---|
| EP | 0715246 | 6/1996 | ............ G06F/1/00 |
| EP | 0969668 | 1/2000 | ............ H04N/7/24 |
| JP | 10-295937 | 11/1998 | |
| WO | WO 99/48296 | 9/1999 | .......... H04N/7/167 |

OTHER PUBLICATIONS

Doenges et al., audio/video and synthetic graphics/audio for mixed media, 1997, elsevier science B. V., 0923–5965.*
Casalino F. et al., "MPEG–4 Systems, Concepts And Implementation", Lecture Notes In Computer Science, Springer Verlag, New York, NY, US, May 26, 1998, pp. 504–517, XP002120837, ISSN: 0302–9743.
A. Eleftheriadis, et al., "N2201—FCD 14496–1–MPEG–4 Systems" International Organization For Standardization—Organisation Internationale De Normalisation, ISO/IEC JTC1/SC29/WG11, May 1998.
K. Hill et al., "MPEG–4 IPR Protection Requirements Specifications", Acts Project AC302–Mirador, Jul. 1998, XP002155817, 50 sheets.

(List continued on next page.)

*Primary Examiner*—Vu Le
*Assistant Examiner*—Behrooz Senfi
(74) *Attorney, Agent, or Firm*—Fitzpatrick, Cella, Harper & Scinto

(57) ABSTRACT

When reconstructing information from a data stream including a plurality of object streams, each object stream having predetermined information, it is necessary to obtain synchronism between a plurality of sets of information in the respective object streams after resuming a reconstruction operation, even if reconstruction of a part of the information is interrupted. For that purpose, each object stream is separated from the data stream. In an operation of reproducing information included in each object stream, when controlling pause and execution of reproduction of one of the plurality of object streams, a timing of control for the one object stream is determined using time information in another object stream. It is thereby possible to perform time management during a pause in decoding.

20 Claims, 6 Drawing Sheets

OTHER PUBLICATIONS

O. Avaro et al., "The MPEG–4 Systems And Description Languages: A way Ahead In Audio Visual Information Representation", Signal Processing, Image Communication, Elsevier Science Publishers, Amsterdam, NL, vol. 9, No. 4, May 1, 1997, pp. 385–431, XP004075337, ISSN: 0923–5965.

"N2323—MPEG–4 Overview—(Dublin version)", International Organization For Standardization—Organisation Internationale De Normalisation, ISO/IEC JTC1/SC29/WG11, Jul. 1998, pp. 1–55.

P.K. Doenges, et al., "Audio/Video And Synthetic Graphics/Audio For Mixed Media", Signal Processing, Image Communication, Elsevier Science Publishers, Amsterdam, NL, vol. 9, No. 4, May 1, 1997, pp. 433–463, XP000700948, ISSN: 0923–5965.

F. Horn et al., "On Programming And Supporting Multimedia Object Synchronization" Computer Journal, Oxford University Press, Surrey, GB, vol. 36, No. 1, 1993, pp. 4–18, XP000360261, ISSN: 0010–4620.

* cited by examiner

DATA PROCESSING METHOD AND APPARATUS FOR A DATA STREAM INCLUDING OBJECT STREAMS

BACKGROUND OF THE INVENTION

1. Field of the Invention

The present invention relates to a data processing method and apparatus, and more particularly, to a data processing method and apparatus for reconstructing certain information from a plurality of object streams, each including predetermined information.

2. Description of the Related Art

Recently, the so-called MPEG-4 is being adopted as a standard method for combining multimedia data including a plurality of objects, such as a moving image, audio and the like, and transmitting resultant data in the form of a single bit stream. The MPEG-4 reception (reproduction) side reproduces, for example, audio and a moving-image scene in a correlated state. In a MPEG-4 reproducing apparatus, in order to protect intellectual property rights such as copyright, it is necessary to provide various types of limitations of use for the entirety or a part of such data.

In general, in order to protect copyright, it has been necessary, for example, to perform cryptographic processing for data to be transmitted, or transmit processed data obtained by embedding data as an electronic transparency at the transmission side. At the reception side, i.e., the reproducing apparatus side, it is arranged to obtain information for deciphering (decoding) a cipher or information necessary for authentication of an electronic transparency, and to decode and reproduce data including a desired moving image and audio from data processed in the above-described manner, when, for example, a proper fee has been paid for the copyright. In an operation of deciphering a cipher or authenticating an electronic transparency, copyright is protected by limiting the number of operations of copying data or prohibiting editing with other objects.

For the above-described MPEG-4 data stream, in contrast to the case of conventional ordinary multimedia data, the function of transmitting/receiving a plurality of video scenes and video projects independently in a single stream is provided. Similarly, as for audio data, a plurality of objects can be reconstructed from a single stream. That is, a MPEG-4 data stream includes a BIFS (binary format for scenes) developed from a VRML (virtual reality modeling language) as information for synthesizing a plurality of scenes. The BIFS is information in which a MPEG-4 scene is described with binary values.

Each of objects necessary for synthesizing the plurality of scenes is subjected to optimum encoding and is transmitted. The decoding side decodes the transmitted data, and reproduces original data by synthesizing scenes by synchronizing the time base of each data with the time base within the reproducing apparatus in accordance with the description of the BIFS.

As described above, in the MPEG-4 method or the like, since a plurality of video objects and scenes are synthesized, it is necessary to provide limitation of use for each copyright. For that purpose, the assignee of the present application has proposed, in Japanese Patent Laid-Open Application (Kokai) No. 10-295937 (1998), a system in which information relating to authentication for the use of copyright is obtained for each object.

However, there has not been proposed a specific approach when not reproducing a specific object authenticated not to be used, or when resuming an operation of decoding or reproducing an object, for which reconstruction or reproduction is interrupted due to an operation of authenticating a regular user (a user who has paid a proper fee), again in synchronization with other objects.

Particularly, if the object for which a decoding or reproducing operation has been interrupted is a moving-image object and is not synchronized with an audio object for which reproduction is continued during that period, so-called lip synchronism is not provided, thereby causing distraction for the viewer. Furthermore, since the amount of data of a moving-image object is generally large, how to economize power consumption during interruption of an operation of decoding the object is a significant problem.

As described above, in processing conforming to MPEG-4 or the like in which a plurality of objects constituting a scene are separately processed, synchronism between a plurality of sets of information when resuming the processing after interruption of an operation of processing a part of the information in order to protect copyright or due to disturbance, noise or the like in satellite communication or the like has become a significant problem.

SUMMARY OF THE INVENTION

It is an object of the present invention to solve the above-described problems.

It is another object of the present invention to provide a data processing method and apparatus in which, even if reconstruction of a part of information is interrupted when reconstructing information from a data stream including a plurality of object streams, synchronism between a plurality of sets of information can be obtained after resuming the reconstruction operation.

According to one aspect of the present invention, a data processing method includes the steps of separaing each object stream from a data stream including a plurality of object streams, each having predetermined information, reproducing synthesis information obtained by synthesizing respective sets of information of the plurality of object streams, and controlling pause and execution of an operation of reproducing one of the plurality of object streams. In the controlling step, a timing of control for the one object stream is determined using time information in another object stream.

According to the above-described configuration, it is possible to assuredly provide synchronism with another information after resuming reconstruction of one information even if reconstruction of that information is interrupted.

According to another aspect of the present invention, a data processing method includes the steps of separating each object stream from a data stream including a plurality of object streams, each having predetermined information, and a control stream having scene description information for synthesizing respective sets of information included in the plurality of object streams, and management information for managing copywright of concerned information, reproducing information included in the plurality of object streams, synthesizing the respective sets of information included in the plurality of object streams based on the scene description information and outputting resultant information, and controlling pause and execution of reproducing at least one of the plurality of object streams, based on the management information. In the controlling step, a timing of control for the at least one object stream is determined using time information in another object stream.

According to still another aspect of the present invention, a data processing device includes input means for inputting a data stream including a plurality of object streams, each having predetermined information, separation means for separating each object stream from the data stream input by the input means, reconstruction means for reconstructing the predetermined information from the object stream separated by the separation means, and control means for controlling pause and execution of reconstruction of information included in an object stream from among the plurality of object streams. The cotrol means determines a timing of control for the one object stream using time information in another object stream.

According to yet another aspect of the present invention, in a data processing device including a data reproducing unit for reproducing synthesis information by separating each object stream from a data stream including a plurality of object streams, each having predetermined information, the data reproducting unit includes input means for inputting the data stream including the plurality of object streams, each having predetermined information, separation means for separating each object stream from the data stream input by the input means, reconstruction means for reconstructing the predetermined information from the object stream separated by the separation means, and control means for controlling pause and execution of reconstruction of information included in an object stream from among the plurality of object streams. The cotrol means determines a timing of control for the one object stream using time information in another object stream.

According to yet a further aspect of the present invention, a data reproducing apparatus includes input means for inputting a data stream including a plurality of object streams, each having predetermined information, and a management stream having scene description information for synthesizing respective sets of information contained in the plurality of object streams, and management information for managing copywright of concerned information, separation means for separating each object stream from the data stream input by the input means, reconstruction means for reconstructing each information separated by the separation means, reproduction means for obtaining reproduction information by synthesizing respective sets of information reconstituted by the reconstruction means based on the scene description information, and control means for controlling pause and execution of reconstruction of information included in at least one object stream from among the plurality of object streams based on the management information. The cotrol means determines a timing of an operation for the one object stream using time information in other object streams.

According to the above-described configuration, protection of copywright, and synchronism between a plurality of sets of information, such as an image and audio, can be compatible.

According to still another aspect of the present invention, in a data processing apparatus which has a data reproducing unit for reproducing synthesis information by separating each object stream from a data stream including a plurality of object streams, each having predetermined information, the data reproducing unit includes input means for inputting a data stream including a plurality of object streams, each having predetermined information, and a management stream having scene description information for synthesizing respective sets of information contained in the plurality of object streams, and management information for managing copyright of concerned information, separation means for separating each object stream from the data stream input by the input means, reconstruction means for reconstructing each information separated by the separation means, reproduction means for obtaining reproduction information by synthesizing respective sets of information reconstructed by the reconstruction means based on the scene description information, and control means for controlling pause and execution of reconstruction of information included in at least one object stream from among the plurality of object streams based on the management information. The cotrol means determines a timing of an operation for the one object stream using time information in other object streams.

According to still another aspect of the present invention, in a computer readable recording medium which stores a data processing program for separating each object stream from a data stream including a plurality of object streams, each having predetemined information, and reproducing synthesis information, the data processing program includes the step of determining, when controlling pause and execution of reproduction of one of the plurality of object streams, a control timing for the one object stream using time information in another object stream.

According to still another aspect of the present invention, in a computer readable recording medium which stores a data processing program for separating each object stream from a data stream including a plurality of object streams, each having predetemined information, and reproducing synthesis information, the data processing program includes an information input module for inputting management information, a management-information analysis module for analyzing the management information, a data-reconstruction control module for reconstructing original data from the data stream in accordance with the management information, and a reconstruction-synchronism control module for controlling synchronism of pause and execution of reproduction based on the management information. When controlling pause and execution of reproduction of one of the plurality of object streams, a control timing for the one object stream is determined using time information in another object stream.

The foregoing and other objects, advantages and features of the present invention will become more apparent from the following detalied description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

Figure 1:
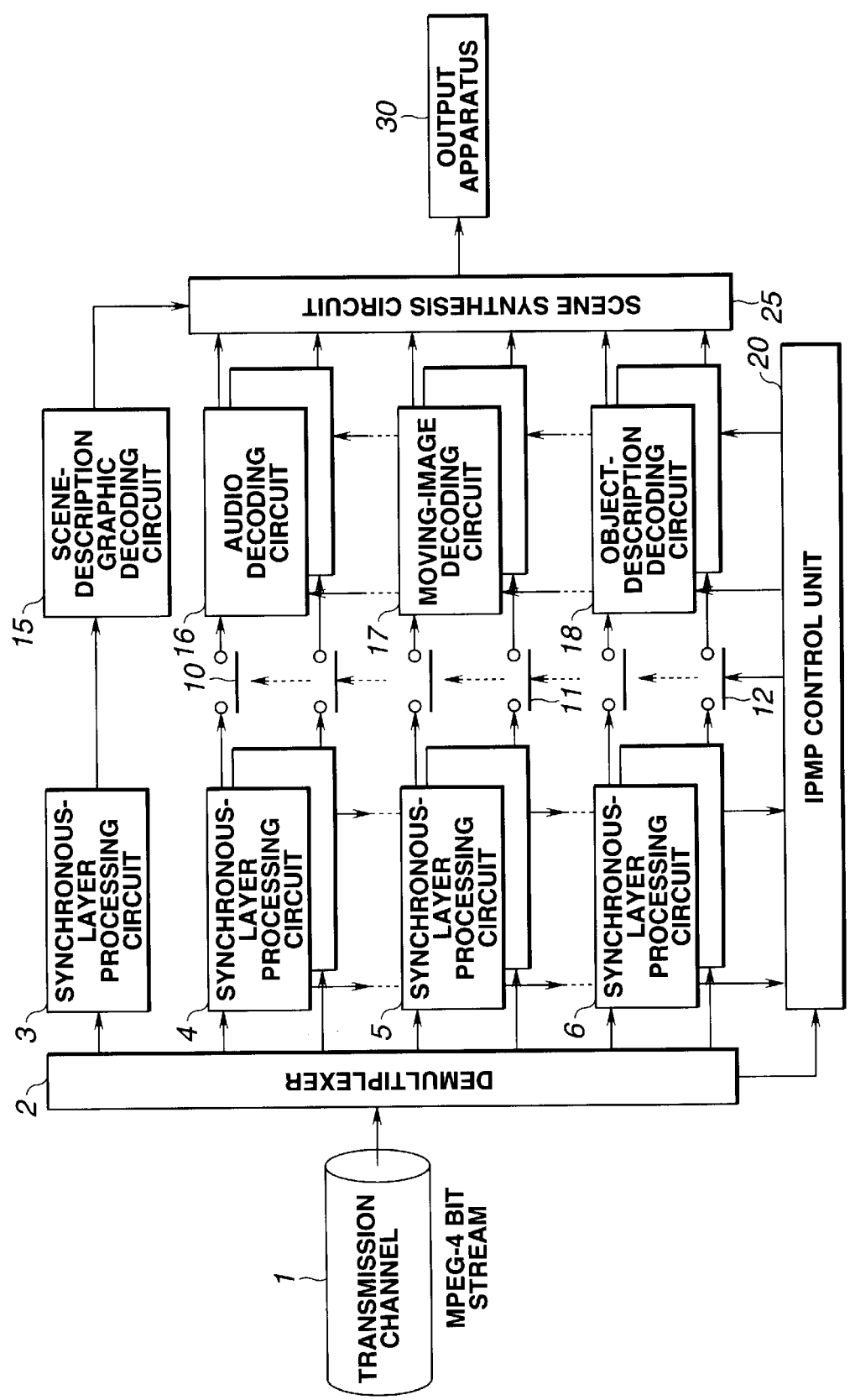
FIG. 1 is a block diagram illustrating the configuration of the entirety of a data processing apparatus according to a preferred embodiment of the present invention.

FIG. 1 is a block diagram schematically illustrating the configuration of an MPEG-4 reproducing apparatus according to the preferred embodiment.

In FIG. 1, a transmission channel 1 comprises a network on which an MPEG-4 bit stream is delivered. In this embodiment, the transmission channel indicates not only a so-called communication channel, but also a storage medium, such as a DVD(digital versatile disc)-RAM (random access memory) or the like.

In the apparatus of this embodiment, when an MPEG-4 bit stream delivered from a network or reproduced from a storage medium has been received, the received MPEG-4 bit stream is input to a demultiplexer 2. In the demultiplexer 2, scene description data including graphic data, audio object data, moving-image object data, object description data and the like are separated from the received MPEG-4 bit stream, and are respectively input to corresponding ones of synchronous-layer processing circuits 3–6.

The audio object data is data subjected to high-efficiency (compression) encoding, such as well-known CELP (Code Excited Linear Prediction) encoding, transform-region weighting interleave vector quantization (TWINVQ) encoding, or the like. The moving-image object data is data subjected to high-efficiency encoding according to a well-known method conforming to MPEG-2 or H.263. The object description data includes, for example, animation and the like, and is encoded in a form adapted to each description data.

The scene description data including graphic data, each audio object, each moving-image object, the object description data and the like which are synchronized in accordance with time information called a time stamp added to the bit stream in the corresponding ones of the synchronous-layer processing circuits 3–6 are data encoded according to high-efficiency (compression) encoding in the above-described manner. These data are decoded by corresponding ones of decoding circuits 15–18 for respective objects.

In this embodiment, it is assumed to use apparatuses capable of performing a decoding operation even if two kinds of different objects are present within the MPEG-4 bit stream for each of the audio object, the moving-image object and the object description data. Hence, it is assumed that two synchronous-layer processing circuits and decoding circuits are provided for each of audio, a moving image and object description data.

The audio object, the moving-image object and the object description data decoded in the decoding circuits 16, 17 and 18, respectively, are supplied to a scene synthesis circuit 25, where a scene is reproduced based on scene description information decoded in the decoding circuit 15, and graphic data is processed. The final multimedia data string thus obtained is supplied to an output apparatus 30, such as a display, a printer or the like, where the data is visualized.

In the received data stream in this embodiment, in consideration of the necessity of control to interrupt and resume reproduction of each object constituting a scene, such as audio, a moving image or the like, in order to protect intellectual property rights such as copyright, IPMP information as described in the previously applied Japanese Patent Laid-Open Application (Kokai) No. 10-295937 (1998) is added to the bit stream.

In the apparatus of this embodiment, the demultiplexer 2 extracts the IPMP information and supplies the extracted information to an IPMP control unit 20. The IPMP control unit 20 stops its operation by shielding the bit stream at an access point 10, 11 or 12, or accessing each of the decoding circuits 16–18, whenever necessary. It is thereby possible to prevent visualization of data even when a bit stream including contents protected by copyright is input.

Figure 2:
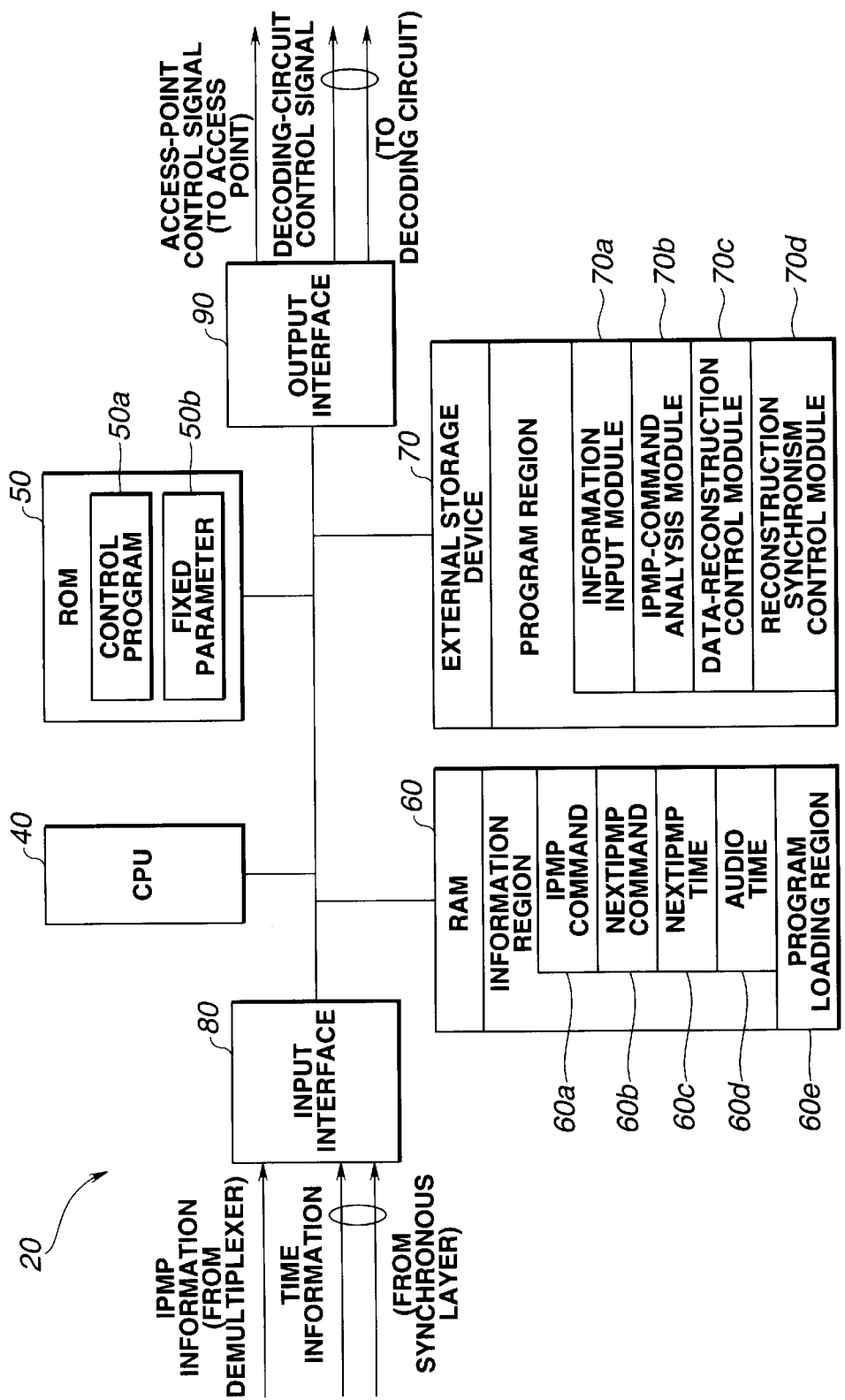
FIG. 2 is a block diagram illustrating the configuration of the IPMP (Intellectual Property Management and Protection) control unit 20 shown in FIG. 1.

FIG. 2 is a block diagram illustrating the configuration of the IPMP control unit 20 shown in FIG. 1.

in FIG. 2, a CPU (central processing unit) 40 for calculation/control controls the IPMP control unit 20. A ROM (read-only memory) 50 stores a fixed control program 50a, a fixed parameter 50b and the like. A RAM 60 is used by the CPU 40 as a temporary storage, and includes an information region (for storing IPMP Command 60a, NEXT IPMP Command 60b, NEXT IPMP Time 60c, Audio Time 60d and the like), and a program loading region 60e for storing programs to be loaded from an external storage medium such as the external storage device 70. The external storage device 70 comprises a floppy disk, a CD(compact disc)-ROM, or the like, and stores programs to be loaded into the program loading region 60e (control programs, such as an infomation input module 70a, an IPMP-Command analysis module 70b, a data-reconstruction control module 70c, a reconstruction-synchronism control module 70d, and the like).

An input interface 80 inputs IPMP information from the demultiplexer 2 or time information from the synchronous-layer processing circuits 4–6. An output interface 90 outputs access-point control signals for the access points 10–12, and decoding-circuit control signals for the decoding circuits 16–18.

Although in this embodiment, the IPMP control unit 20 is described as an independent processor unit, it will be clear to those skilled in the art that a configuration may also be adopted in which the CPU 40 controls a part or the entirety of the MPEG-4 reproducing apparatus or the function of the apparatus is realized by software.

Figure 3:
FIG. 3 is a diagram illustrating the configuration of IPMP information to be dealt with in the apparatus shown in FIG. 1.

FIG. 3 illustrates an example of the above-described IPMP information.

As shown in FIG. 3, each IPMP information comprises two parameters, i.e., IPMP Time 100 and IPMP Command 110. As shown in FIG. 3, the IPMP Time is numerical data indicating time information for obtaining synchronism with other objects, and is represented in units of a millisecond (msec). The IPMP Command is a command for controlling a state of reproducing a moving image by controlling the decoding circuit 17 for reproducing a moving-image object, or the like.

That is, the IPMP information shown in FIG. 3 is a command to reproduce a moving image corresponding to a First IPMP Packet at a time of 0 msec, perform pause of reproduction of a moving image corresponding to a Third IPMP Packet at a time of 2,000 msec, and reproduce (resume reproduction of) a moving image corresponding to a Fourth IPMP Packet at a time of 8,000 msec. That is, the IPMP information shown in FIG. 3 performs control so that reproduction of a moving-image object is temporarily interrupted during a time period of 2–8 seconds within a time period of 1–60 seconds.

The operation of the apparatus of the embodiment, particularly the operation using IPMP information, will now be described in detail with reference to the flowcharts shown in FIGS. 4 and 5. The flowcharts shown in FIGS. 4 and 5 illustrate synchronism during interruption/resumption of reconstruction in this application, and the details of control of interruption/resumption of reconstruction are omitted for the purpose of simplification.

Figure 4:
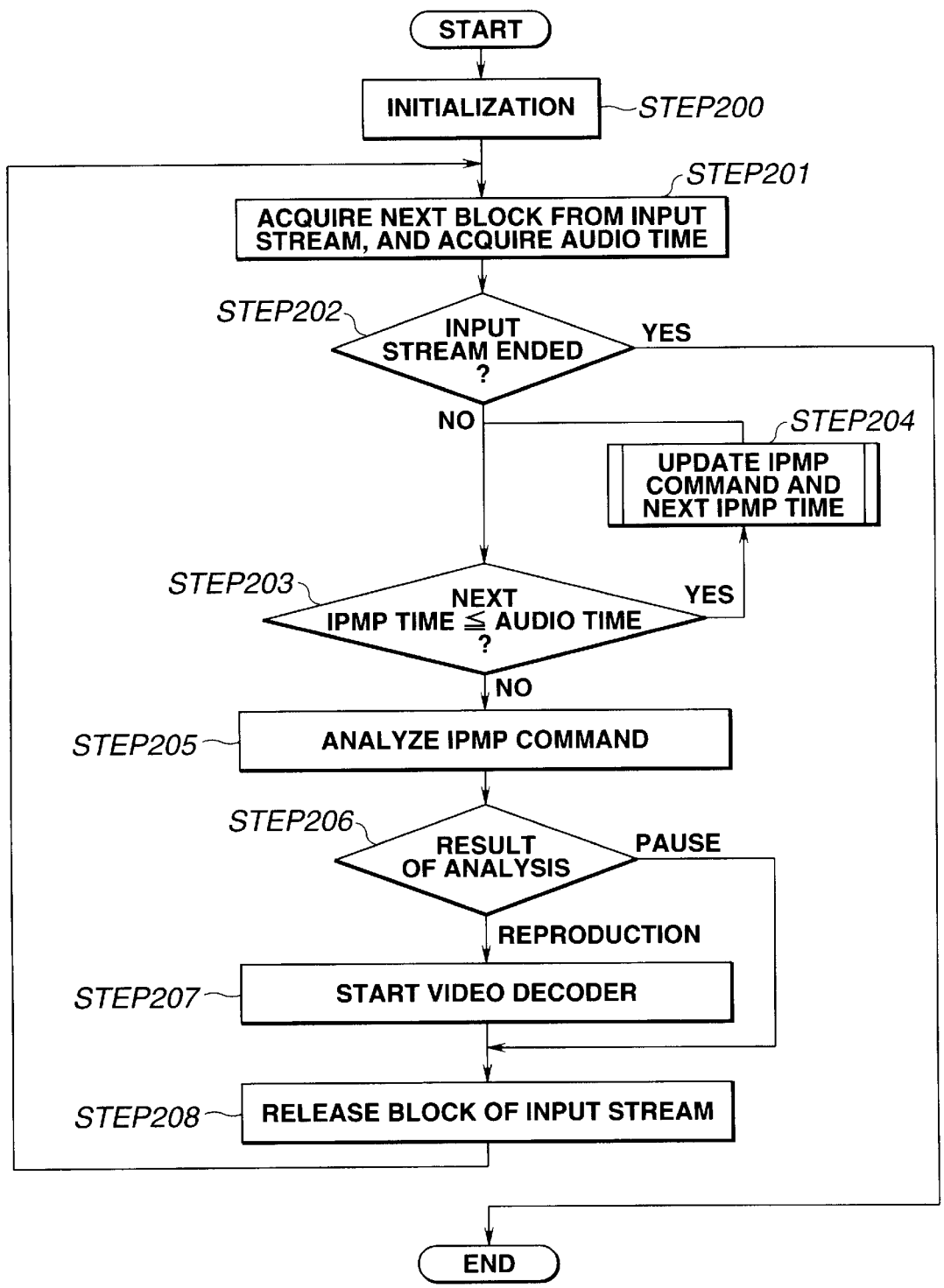
FIG. 4 is a flowchart illustrating the operation of the IPMP control unit 20 shown in FIG. 2.
Figure 5:
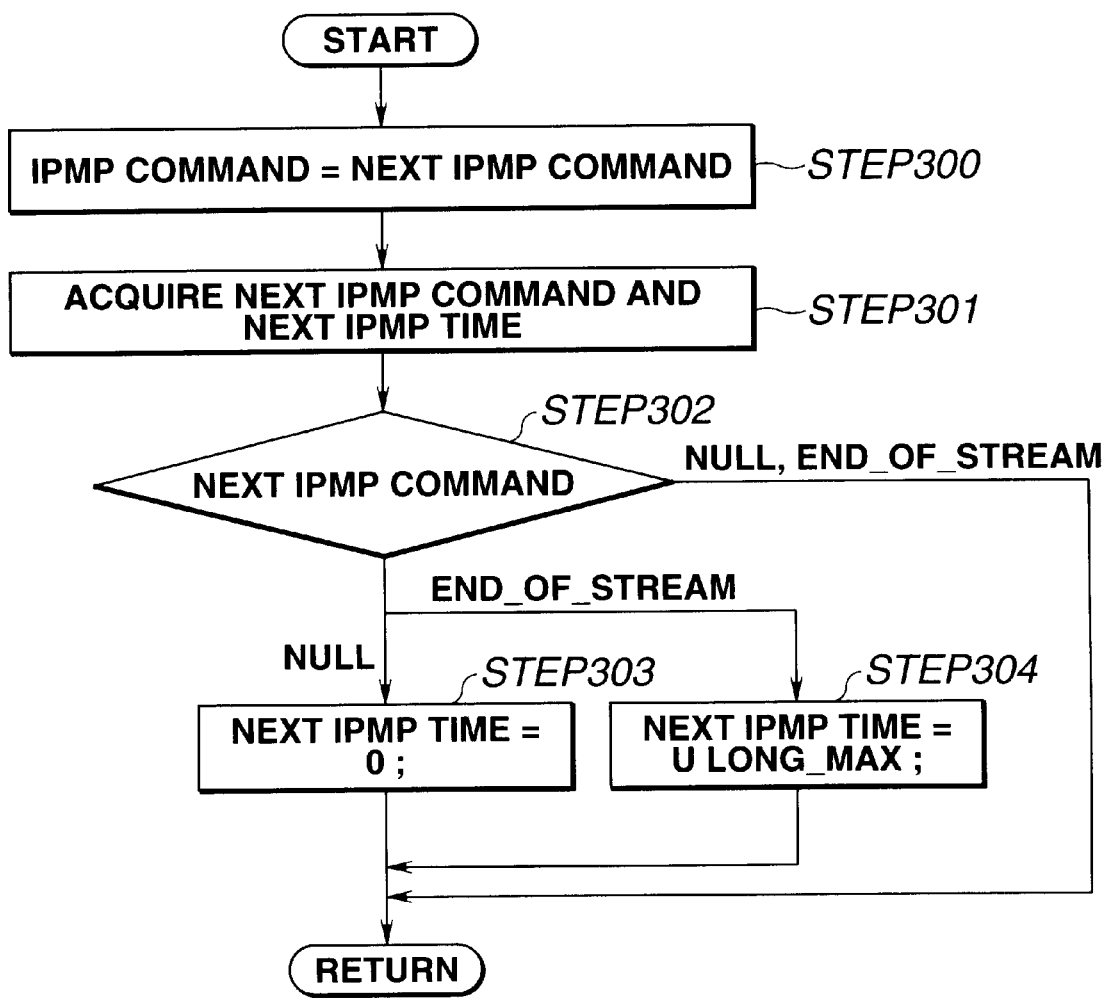
FIG. 5 is a flowchart illustrating processing in step S204 shown in FIG. 4.

FIG. 4 is a flowchart illustrating the operation of the IPMP control unit 20 when an MPEG-4 bit stream where IPMP information is added for moving-image data is received. Accordingly, an input stream in FIG. 4 is a bit stream of moving-image data.

Upon recognition that the above-described IPMP information is included within the bit stream for one moving-image data, then in step 200, the IPMP control unit 20 performs initialization so as to make IPMP Command 60a indicating the current moving-image reproduction control method to be "NULL", make NEXT IPMP Command 60b indicating the next moving-image reproduction control method to be "NULL", and make NEXT IPMP Time 60c indicating the time of acquisition of a block from the IPMP stream to be "0".

Then, in step 201, the IPMP control unit 20 acquires the next block (coresponding to a packet shown in FIG. 3) from the input moving-image stream separated by the demultiplexer 2. At that time, the synchronous-layer processing circuit 4 extracts a time stamp from the audio-data stream, and stores time information described in the time stamp as Audio Time 60d.

Then, in step 202, it is determined if the input stream (moving-image stream) has ended. If the result of the determination in step 202 is affirmative, the process is terminated. If the result of the determination in step 202 is negative, the process proceeds to step 203, where it is determined if the above-described NEXT IPMP Time 60c is equal to or less than the above-described Audio Time 60d. If the result of the determination in step 203 is affirmative, the process proceeds to step 204 in order to acquire information relating to a new IPMP block. If the result of the determination in step 203 is negative, the process proceeds to step 205 because it is unnecessary to update IPMP Command and NEXT IPMP Time.

The operation of acquiring IPMP Command and IPMP Time, and the operation of updating IPMP Command, NEXT IPMP Command and NEXT IPMP Time in step 204 will now be described with reference to the flowchart shown in FIG. 5.

First, in step 300, NEXT IPMP Command is made IPMP Command. Then, in step 301, NEXT IPMP Command is newly acquired as data of the next moving-image reproducing method. The NEXT IPMP Time and NEXT IPMP Command are acquired as a pair of two parameters as shown in FIG. 3.

In step 302, the contents of the acquired NEXT IPMP Command are determined. If the contents indicate neither "NULL" nor "END OF STREAM", the process is terminated and returns. When it has been determined that NEXT IPMP Command is "NULL", the process proceeds to step 303, where information of NEXT IPMP Time is set to "0", and the process is terminated. When it has been determined that NEXT IPMP Command is "END OF STREAM", the process proceeds to step 304, where the value of NEXT IPMP Time is set to the maximum value (ULONG MAX= 0xffffffff), and the process is terminated and returns.

Returning to FIG. 4, in step 205, the IPMP Command set in step 300 is analyzed. Then, in step 206, it is determined if the result indicates a command to execute reproduction of a moving-image object, or a command of pause of the reproduction. For example, in the IPMP information shown in FIG. 3, a command "Pause Third IPMP Packet" at a time of 2,000 msec is determined to be a command of pause of reproduction. On the other hand, if the command starts with "Play", the command is determined to be a command to execute (resume) reproduction. Accordingly, a command at a time other than the above-described time 2,000 msec is determined to be a command to execute reproduction.

When it has been determined in step 206 that the command is a command of pause of reproduction, the process proceeds to step 208. When it has been determined in step 206 that the command is a command to execute reproduction, the process proceeds to step 207. In step 207, the moving-image decoding circuit 17 is started or the operation of the moving-image decoding circuit 17 is continued, and the process then proceeds to step 208. In step 208, the block acquired from the input moving-image stream in step 201 is released. The process then returns to step 201, where the next block is awaited.

Synchronization between respective objects when the moving-image decoding circuit 17 is started or while the operation of the moving-image decoding circuit 17 is continued is performed based on time stamps possessed by respective objects. However, since this operation is not the main subject of the present invention, further description thereof will be omitted.

That is, when the processing of the above-described steps 201–208 is executed for the IPMP information shown in FIG. 3, IPMP Command is Pause Third IPMP Packet during a time period of 2,000 msec–8,000 msec, so that reproduction is interrupted only during this period. In other time periods, IPMP Command is Play (First, Second, Fourth–Last) IPMP Command, so that reproduction is executed.

Next, other operations in this embodiment will be schematically described with reference to the diagram shown in FIG. 6, in order to facilitate understanding of the function of the embodiment.

Figure 6:
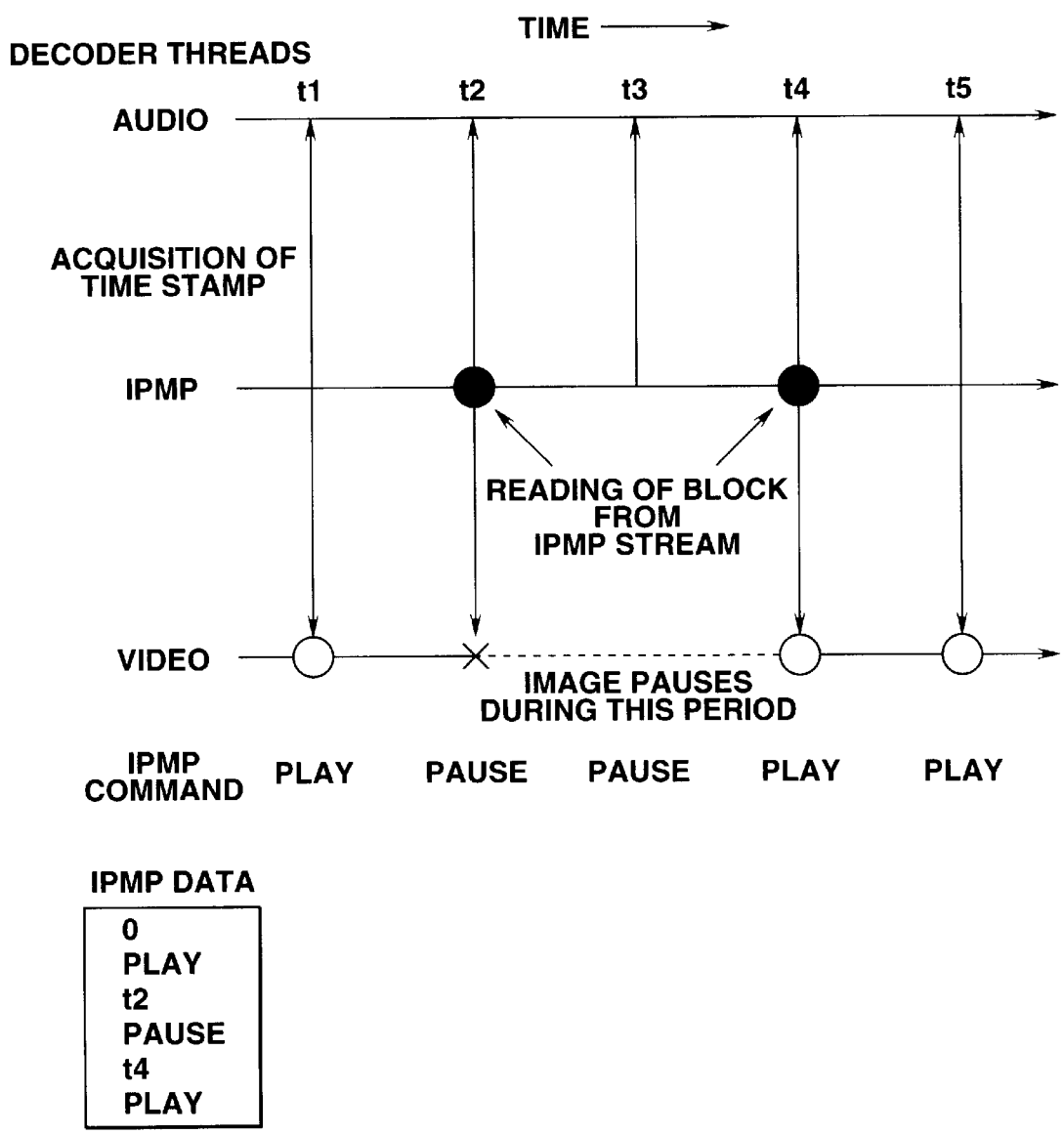
FIG. 6 is a time chart schematically illustrating the operation of the apparatus shown in FIG. 1.

In IPMP information shown in FIG. 6, IPMP Command is Play, Pause and Play (resumption) at time 0, t2 and t4, respectively.

An IPMP thread is configured so as to always acquire a time stamp from an Audio stream, and also controls Audio and Video threads.

Since IPMP Command remains to be "Play" at time t1, an IPMP thread starts (operates) a Video thread in order to reconstruct and reproduce a moving image.

Then, at time t2, the IPMP Command is updated by reading a new block from the IPMP stream. Since the updated IPMP Command is "Pause", the IPMP thread does not start the corresponding Video thread. Accordingly, the moving image is not reproduced, and pauses at time t2. The word "pause" indicates to freeze a moving-image object by a circuit within the scene synthesis circuit 25.

At time t3, the state of pause of reproduction is continued without updating the IPMP Command, so that the reproduced image by the moving-image object maintains a state of pause.

At time t4, the IPMP Command is updated by newly reading a block from the IPMP stream. Since the IPMP Command updated at that time is "Play", the corresponding moving-image thread is started. At that time, as described above, since the IPMP thread makes IPMP Time within the moving-image stream to coincide with time information represented by a time stamp acquired from the Audio thread, reproduction of a moving image is resumed in a state of being synchronized with audio.

At time t5, the IPMP Command is not updated. Since the IPMP Command remains "Play", the IPMP thread continues to start the moving-image thread to continue reproduction of the moving image.

In this embodiment (FIG. 1), pause of reproduction of a moving image is realized by preventing the moving-image stream to flow to the moving-image decoding circuit 17 by disconnecting the access point 11 for a moving image, and interrupting the operation of the moving-image decoding circuit 17. The operation of interrupting the operation of the moving-image decoding circuit 17 is performed in the following manner.

In an MPEG-4 reproducing apparatus, since respective streams for audio, a moving image, intellectual-property information and the like are generally processed at separate threads, processing of each of these threads may be controlled. The well-known "Semaphore" is used as application software for controlling such multithread processing.

Although in the above-described embodiment, both disconnection of an access point and interruption of the operation of the decoding circuit are performed, the functions of the embodiment may be realized only by interrupting the operation of the decoding circuit. In such a case, it is unnecessary to provide access points for disconnecting streams. Encoding of a moving image is mainly performed according to a method of encoding a difference between data using interframe prediction, such as a method conforming to H. 263 or MPEG-2. Accordingly, it is not preferable to perform only control of a stream using access points, because meaningless information is also processed by a decoding circuit. As in the above-described embodiment, by interrupting the operation of a decoding circuit for codes obtained by interframe prediction, it is possible to provide effects such that the moving-image decoding circuit 17 does not supply the scene synthesis circuit 25 with meaningless data, and that an erroneous operation of the scene synthesis circuit 25 is prevented. This also prevents waste of time and electric power in the decoding circuit 17.

In the above-described embodiment, since a predetermined audio decoding circuit operates, and synchronization information called a time stamp is obtained from a synchronous layer of audio, it is possible to use a time stamp in audio information which is processed in a real-time base. Hence, synchronism between audio and a moving image after resuming reconstruction of moving-image information is more exactly and assuredly provided. However, the present invention is not limited to such an approach, and can also be applied to any combination, provided that synchronism between an object of a moving image or audio for which reconstruction is interrupted and any other object for which reconstruction is not interrupted is maintained.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system or an apparatus with a storage medium storing program codes of software for realizing the functions of the above-described embodiment, and reading and executing the program codes stored in the storage medium by means of a computer (or a CPU or an MPU (microprocessor unit)) of the system or the apparatus. In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD(compact disc)-ROM, a CD-R (recordable), a magnetic tape, a nonvolatile memory card, a ROM or the like may be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

When applying the present invention to the storage medium, program codes corresponding to the above-described flowcharts are stored in the storage medium. Briefly speaking, program codes including the respective modules described in the external storage device 70 shown in FIG. 2 are stored in the storage medium. For example, program codes including the respective modules, such as the information input module 70*a*, the IPMP Command analysis module 70*b*, the data-reconstruction control module 70*c*, the reconstruction-synchronism control module 70*d* and the like, may be stored in the storage medium.

As described above, according to the present invention, each object stream is separated from a data stream including a plurality of object streams, each having predetermined information. In a reproducing operation, when controlling pause and execution of reproduction of one of the plurality of object streams, even if reconstruction of information is interrupted, synchronism with another information can be assuredly obtained after resuming the reconstruction.

The individual components shown in outline or designated by blocks in the drawings are all well known in the data processing method and apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing method, comprising the steps of:
   separating each object stream from a data stream including a plurality of object streams, wherein the data stream includes a data management stream including a reproduction controlling command and time information;
   reproducing synthesis information obtained by synthesizing respective sets of information relating to the plurality of object streams; and
   controlling the reproducing of one of the object streams in accordance with information of the data management stream, wherein said controlling step controls the reproducing of one of the object streams based on the reproducing controlling command and a relationship between the time information of the data management stream and a time specified by information in another one of the object streams.

2. A method according to claim 1, wherein the one object stream for which the reproducing step is controlled includes moving-image information, and wherein the another object stream includes audio information.

3. A method according to claim 2, wherein the moving-image information comprises information subjected to interframe-prediction encoding.

4. A method according to claim 1, wherein information within the one object stream for which the reproducing step is controlled is subjected to high-efficiency encoding, and wherein the control is performed by pause and execution of an operation of decoding the information subjected to high-efficiency encoding.

5. A method according to claim 1, wherein the data stream includes an audio object stream, respective object streams of a plurality of image objects, and scene description information for synthesizing the plurality of object streams.

6. A method according to claim 1, wherein control of the plurality of object streams is executed by management of multithread processing in units of each object stream.

7. A recording medium which records a program for execution by a computer to perform the data processing method of claim 1.

8. A data processing method, comprising the steps of:
separating each object stream from a data stream including a plurality of object streams and a control stream having scene description information for synthesizing respective sets of information included in the plurality of object streams, and management information for managing copyright of copyright information, wherein the management information includes a reproduction controlling command and time information;
reproducing information included in the plurality of object streams;
synthesizing the respective sets of information included in the plurality of object streams based on the scene description information and outputting resultant information; and
controlling the reproducing of one of the object streams in accordance with the reproduction controlling command and information based on a relationship between the time information of the management information and a time specified by information in another one of the object streams.

9. A method according to claim 8, wherein the object stream for which the reproducing operation is controlled includes moving-image information subjected to interframe-prediction encoding, and wherein another object stream includes audio information.

10. A recording medium which records a program for execution by a computer to perform the data processing method of claim 8.

11. A data processing device, comprising:
input means for inputting a data stream including a plurality of object streams, wherein the data stream includes a data management stream including a reconstruction controlling command and time information;
separation means for separating each object stream from the input data stream;
reconstruction means for reconstructing information included in the plurality of object streams; and
control means for controlling the reconstruction of one of the object streams in accordance with the reconstruction controlling command and information based on a relationship between the time information of the data management stream and a time specified by information in another one of the object streams.

12. A data processing device, comprising:
a data reproducing unit for reproducing synthesis information by separating each object stream from a data stream including a plurality of object streams and a data management stream, wherein the data management stream includes a reproduction controlling command and time information, said data reproducing unit comprising:
input means for inputting the data stream including the plurality of object streams;
separation means for separating each object stream and the data management stream from the input data stream;
reconstruction means for reconstructing the object stream separated by said separation means; and
control means for controlling the reconstruction of one of the object streams in accordance with the reproduction controlling command and information based on a relationship between the time information of the data management stream and a time specified by information in another one of the object streams.

13. A device according to claim 12, wherein information included in the one object stream for which the reconstruction operation is controlled comprises moving-image information, and wherein the another object stream includes audio information.

14. A device according to claim 13, wherein the moving-image information comprises information subjected to interframe-prediction encoding.

15. A device according to claim 12, wherein information included in the one object stream for which the reconstruction operation is controlled is subjected to high-efficiency encoding, and wherein said control means controls an operation of decoding means for decoding the information subjected to high-efficiency encoding.

16. A device according to claim 12, wherein the data stream includes an audio object stream, object streams of a plurality of image objects, and scene description information for synthesizing the plurality of image objects.

17. A method according to claim 1, wherein said controlling step includes executing control of the plurality of image-object streams by management of multithread processing in units of each object stream.

18. A data processing apparatus, comprising:
input means for inputting a data stream including a plurality of object streams, a management stream having scene description information for synthesizing respective sets of information included in the plurality of object streams, and management information for managing copyright of copyright information, wherein the management information includes a reconstruction controlling command and a time information;
separation means for separating each object stream from the input data stream;
reconstruction means for reconstructing sets of information of each object stream separated by said separation means;
reproduction means for obtaining reproduction information by synthesizing respective sets of information reconstructed by said reconstruction means based on the scene description information; and
control means for controlling the reconstruction of one of the object streams in accordance with the reconstruction controlling command and information based on a relationship between the time information of the management information and a time specified by information in another one of the object streams.

19. A data processing apparatus which has a data reproducing unit for reproducing synthesis information by separating streams from a data stream, said data reproducing unit comprising:

input means for inputting a data stream including a plurality of object streams and a management stream having scene description information for synthesizing respective sets of information included in the plurality of object streams and management information for managing copyright of copyright information, wherein the management information includes a reproduction controlling command and a time information;

separation means for separating each object stream from the input data stream;

reconstruction means for reconstructing sets of information of each object stream separated by said separation means;

reproduction means for obtaining reproduction information by synthesizing respective sets of information reconstructed by said reconstruction means based on the scene description information; and control means for controlling the reconstruction of one of the object streams in accordance with the reproduction controlling command and information based on a relationship between the time information of the management information and a time specified by information in another one of the object streams.

20. An apparatus according to claim 19, wherein information included in the one object stream for which the reconstruction operation is controlled is moving-image information subjected to interframe-prediction encoding, and wherein the other object stream includes audio information.

* * * * *